(12) United States Patent
Prusia

(10) Patent No.: US 7,817,191 B2
(45) Date of Patent: Oct. 19, 2010

(54) CLOCK SERIALIZER/DESERIALIZER TRANSMISSION METHOD AND APPARTUS

(75) Inventor: Ronald Norman Prusia, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 778 days.

(21) Appl. No.: 11/821,473

(22) Filed: Jun. 21, 2007

(65) Prior Publication Data

US 2008/0316320 A1 Dec. 25, 2008

(51) Int. Cl.
*H04N 5/76* (2006.01)
(52) U.S. Cl. .............................. 348/231.1; 348/231.99; 348/211.5

(58) Field of Classification Search ............ 348/231.99, 348/231.1, 211.99–211.6
See application file for complete search history.

(56) References Cited

U.S. PATENT DOCUMENTS

| 7,385,624 | B2* | 6/2008 | Takehara et al. | ............. 348/36 |
| 7,564,484 | B2* | 7/2009 | Rotte et al. | ............. 348/211.1 |
| 2004/0169733 | A1* | 9/2004 | Ishizaka et al. | .......... 348/211.2 |

* cited by examiner

*Primary Examiner*—Tuan Ho
(74) *Attorney, Agent, or Firm*—David S. Kalmbaugh

(57) ABSTRACT

An apparatus and method for use in transmitting data that is supplied with a high jitter input clock in a serial data stream over a single fiber cable. Video data from a camera is stored in memory using the high jitter clock. A stable clock is used to transmit the data from memory. To account for drift between the input clock and the stable clock idle words are added to or deleted from the transmitted data.

20 Claims, 5 Drawing Sheets

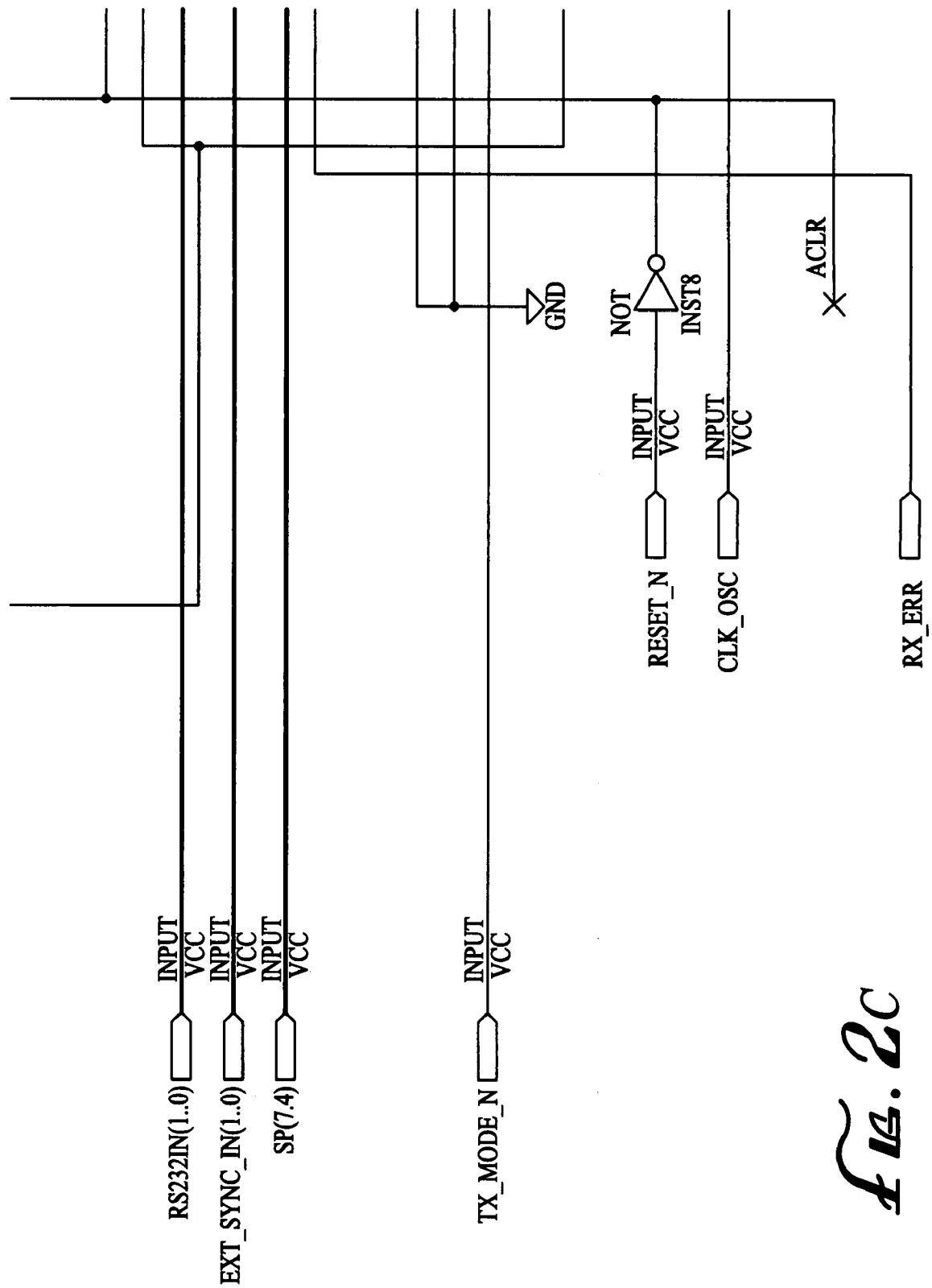

CLOCK SERIALIZER/DESERIALIZER TRANSMISSION METHOD AND APPARTUS

BACKGROUND OF THE INVENTION

1. Field of the Invention

The present invention relates generally to serial data transmission. More particularly, the present invention relates to an apparatus and method which is used for transmitting data that is sourced with a high jitter clock signal in a serial data stream over a single fiber cable or wire.

2. Description of the Prior Art

SerDes or serializer/deserializer devices facilitate the transmission of parallel data in a serial format between two points over a single serial transmission line which reduces the number of data paths and the number of fiber cables or wires required.

When a digital clock is being transmitted with digital data, it is desirable not to have a second fiber cable for transmitting the digital clock. In this particular case, the digital clock is embedded into the digital data. Transmission circuits need to be designed with sufficient edge transitions so that the signal's receiving end can regenerate the digital clock.

It is very desirable to transmit the data with a clock that is very stable, that is a clock having low jitter. When the data for transmission includes a clock with very high jitter, it very difficult or impossible to receive the information.

The method normally used to transmit a digital clock with high jitter is to filter the clock prior to transmission.

The digital clock is filtered with a low pass filter or a phase lock loop which is a closed-loop feedback control system. Filtering using a low pass filter or a phase lock loop reduces some low frequency jitter, but does not provide a complete solution for removing jitter from a high frequency digital clock.

There is also a commercially available device which use phase lock loop technology along with a stabilized reference clock to attenuate jitter. However, this device only supports standard communication frequencies and does not support a non-standard communication frequency over a fiber cable.

SUMMARY OF THE INVENTION

The present invention overcomes some of the difficulties of the past including those mentioned above in that it comprising an effective interface circuit and method for transmitting video data over a fiber cable.

The interface circuit includes a first-in first-out (FIFO) memory for receiving and then storing video data and control signals generated by the camera. An input clock from the camera is used to clock the data into memory. This input clock is a high jitter clock signal.

A stable clock is used to transmit the data stored in memory from memory over a single transmission line. A controller monitors memory usage and either adds idle words to the data transmitted from memory or deletes idle words from the data transmitted from memory until the memory usage is approximately one half of memory capacity. The addition and removal of words follows the drift between the input clock and the stable clock.

When the FIFO memory becomes less than one quarter full, the controller waits for an idle/sync word and then transmits the word twice. The controller will continue this process until memory space within the FIFO memory is more than one quarter full.

When the FIFO memory becomes greater than three quarters full, the controller again waits for an idle/sync word. At this time the controller will read out two words in one cycle ignoring one of the idle/sync words. The controller will continue this process until memory space within the FIFO memory is less than three quarters full.

DETAILED DESCRIPTION OF A PREFERRED EMBODIMENT

Figure 1:
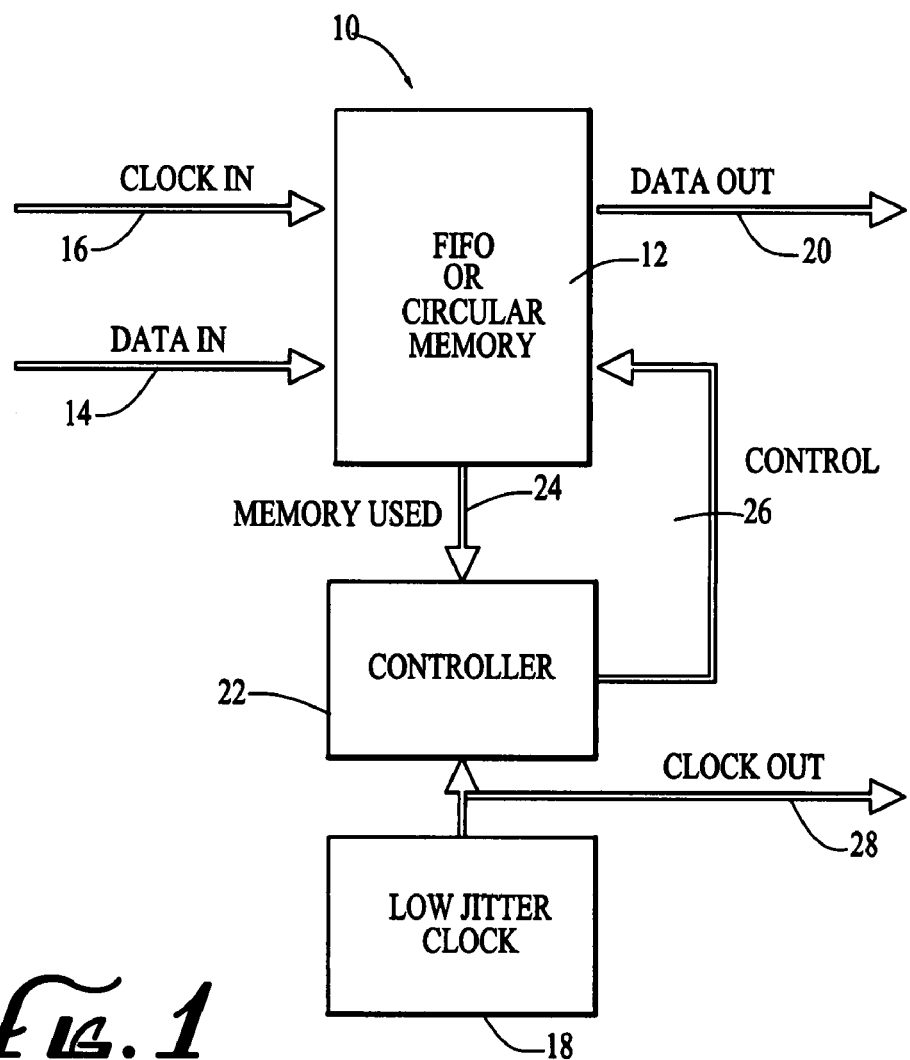
FIG. 1 is a block diagram of the electronic interface circuit for transmitting a serial data stream over a single fiber cable.
Figure 2:
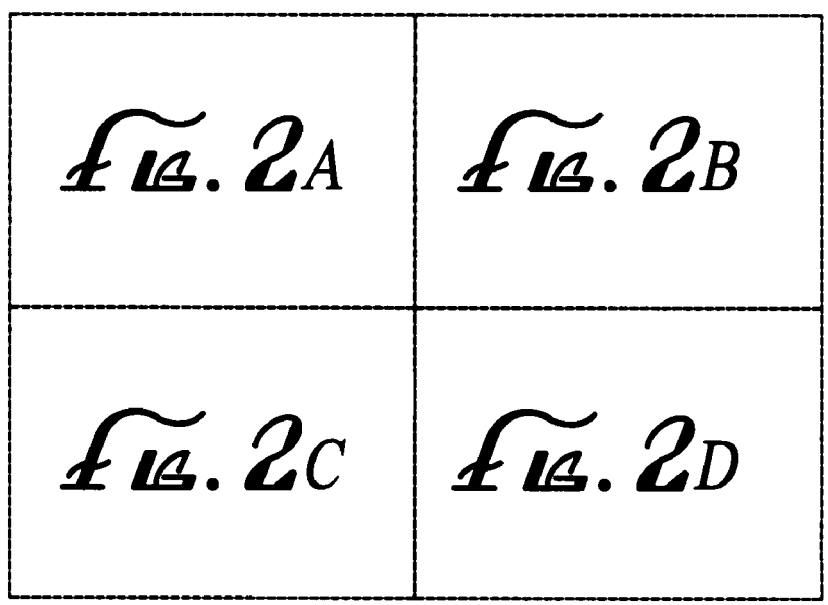
FIGS. 2A, 2B, 2C and 2D are a detailed electrical schematic diagram of the electronic interface circuit of FIG. 1.
Figure 2A:
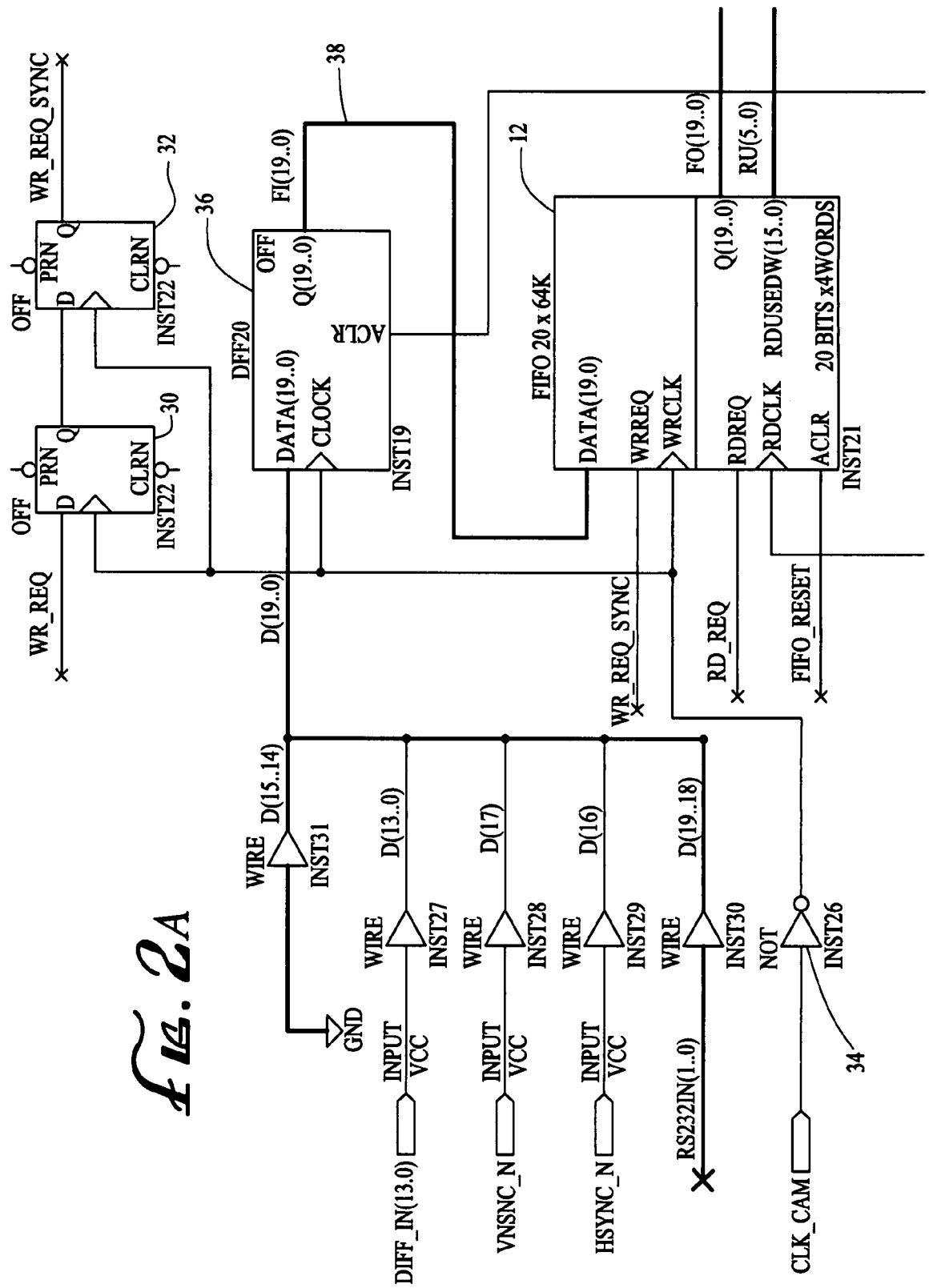
Figure 2B:
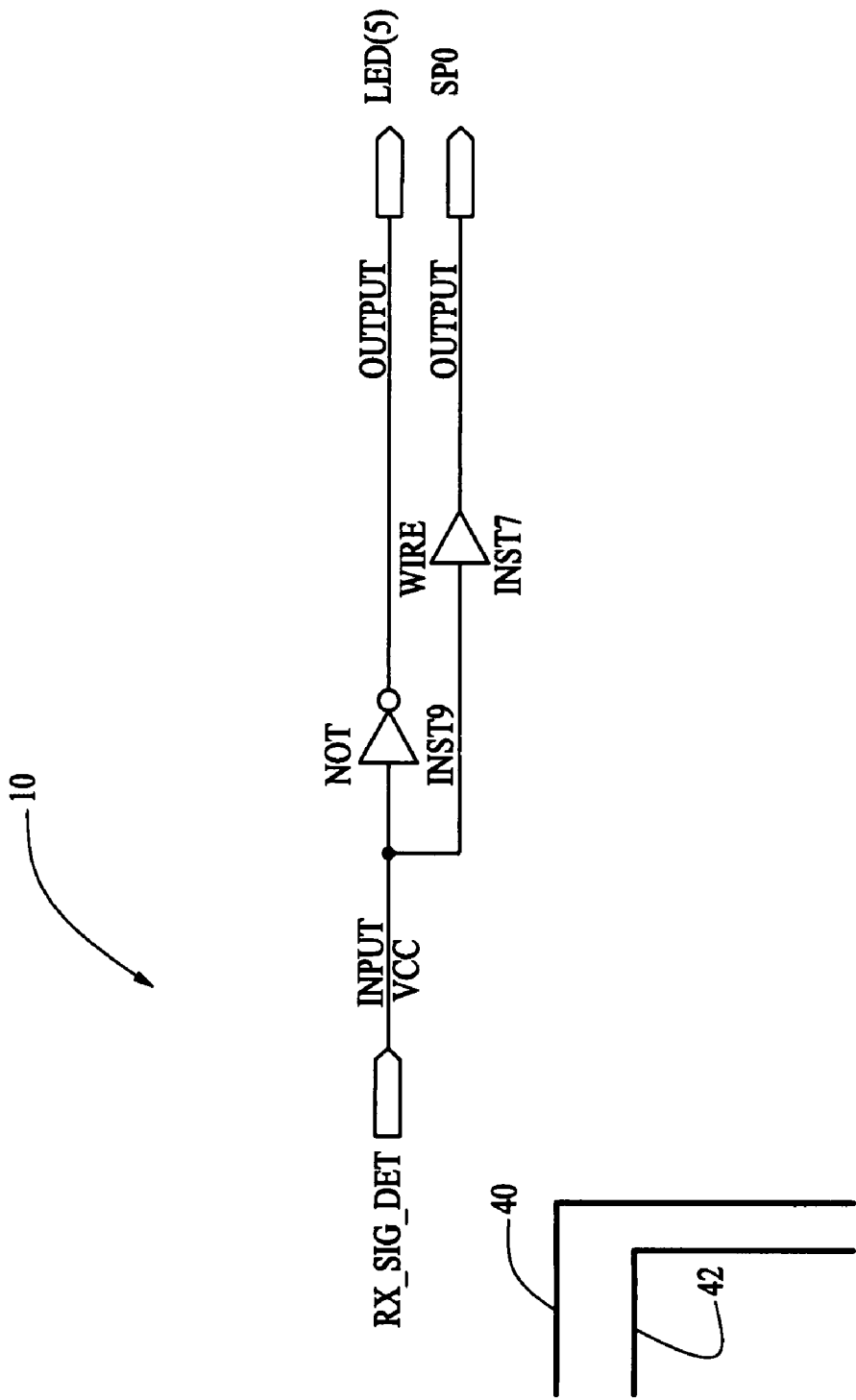
Figure 2D:
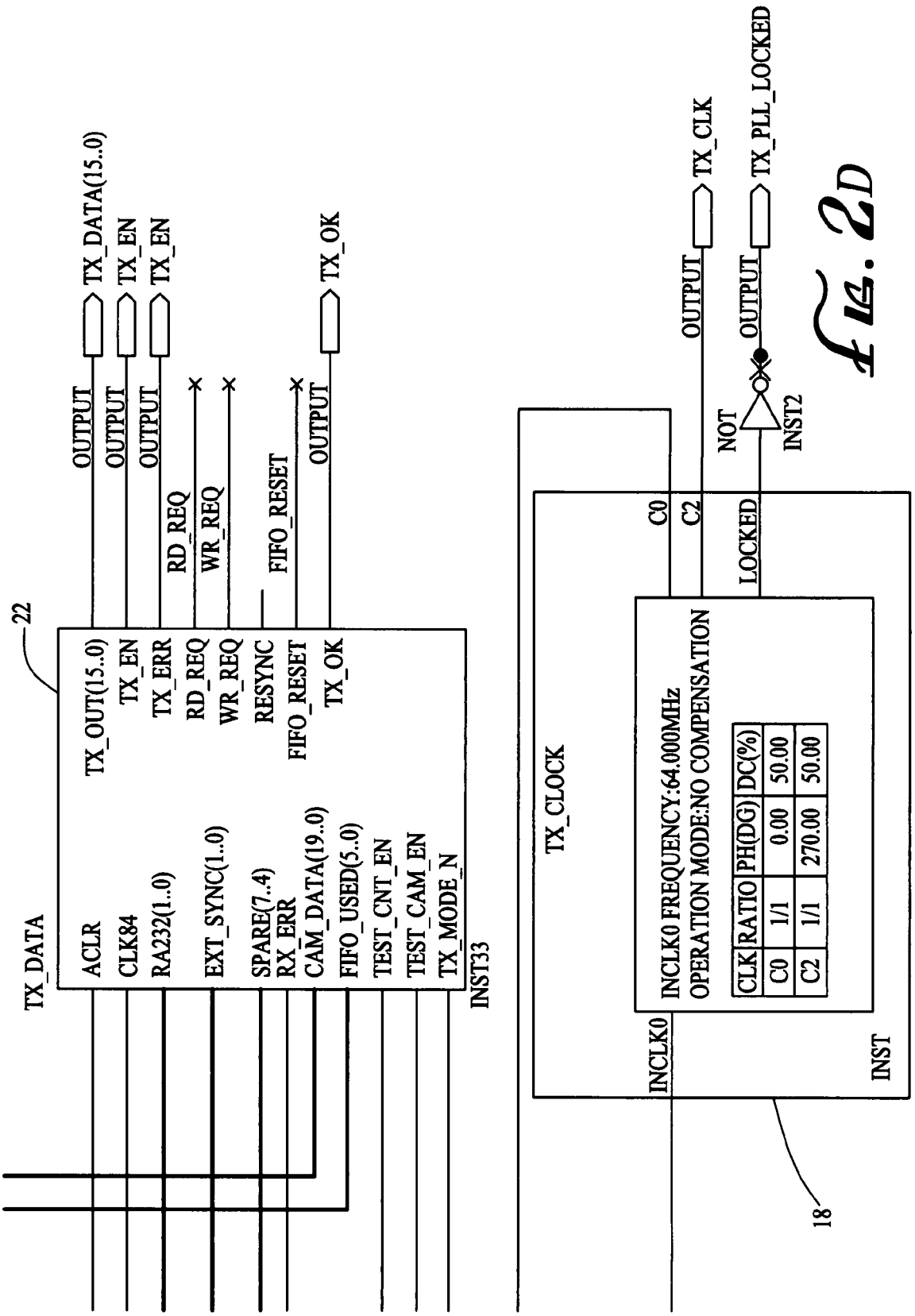

Referring to FIG. 1, there is shown a block diagram of an electronics interface circuit, designated generally by the reference numeral 10, for transmitting serializer/deserializer (Ser/Des) digital data with high jitter on the digital input clock, which is the Ser/Des data clock. SerDes facilitates the transmission of parallel digital data between two points over a serial stream, such as a single fiber cable.

Electronic interface circuit 10 includes a first-in, first-out (FIFO) memory 12 which stores Ser/Des digital data provided to memory 12 via a data-in line 14. The data is input to FIFO memory 12 using the high jitter digital clock which is supplied to memory 12 via clock-in line 16. After the data is stored in FIFO memory 12, a stable clock is used to output the data from memory 12 and then transmit the data via a data-out line 20. A low jitter clock generator 18, which generates the stable clock, supplies the stable clock to FIFO memory 12.

Electronic interface circuit 10 also includes a controller 22, which monitors the drift between the stable transmitter clock and the high jitter digital clock by monitoring memory usage within FIFO memory 12. A memory used line 24 connects controller 22 to FIFO memory 12 allowing the controller 22 to monitor memory usage within FIFO memory 12.

Data transmitted via interface circuit 10 includes idle or unused words. When FIFO memory 12 is not near half full, controller 22 will either add or subtract idle or unused word in response to the drift between the high drift digital input clock and the stable transmission clock. This method of monitoring memory usage requires that there is a sufficient number of unused words to account for the drift between the digital input clock and the stable transmitter clock.

There is also a control line 26 which connects the controller 22 to FIFO memory 12. The control line 26 is used to enable when data is read or written to/from FIFO memory 12. The data transmitter clock is operating at a faster frequency than the digital input clock. For example, if FIFO memory 12 is approaching empty, the controller 22 then limits the data being read from the FIFO memory 12 until data is stored in about half of FIFO memory 12. If the memory 12 is almost full, additional data is read from the FIFO memory 12.

Referring to FIGS. 2A, 2B, 2C and 2D, FIG. 2 is a detailed electrical schematic diagram of interface circuit 10 of FIG. 1. A video camera generates digital video data which is provided to the diff_in[13 . . . 0] input of interface circuit 10. The video camera also provides a pair of control signals which indicate the validity of the video data provided by the camera. When the control signals indicate that there is invalid data being read into FIFO memory 12 and FIFO memory 12 is in a time period where it is approaching its capacity for data storage, video data in FIFO memory 12 is deleted from FIFO memory 12.

When there is a requirement to add data, data consisting of logic zeros is added to the data being transmitted out of FIFO memory 12. Controller 22 is responsible for the deletion of data from FIFO memory 12 and the addition of data being transmitted out of FIFO memory 12.

The two control signals provided by the video camera to circuit 10 include a vertical sync (vsync_n) control signal and a horizontal sync (hsync_n) control signal. The information provided by the video camera to circuit 10 consist of data bits 13 . . . 0 (diff_in[13 . . . 0]), and the two control signals which are bits 16 and 17. The camera also provides a camera clock (clk_cam) which is a 32 MHz clock having a high rate of jitter.

D Flip-Flops 30, 32 provide synchronization for the wr_req (write request) signal and are clocked by the camera clock after the camera clock passes through an inverter 34. The control signal wr_req_sync appearing at the Q output of D Flip-Flop 32 is used as a synchronizing signal supplied to the wrreq (write request) input of FIFO memory 12. This control signal operates as the synchronization signal for the camera clock which is supplied to the wrclk (write clock) input of controller 12. The camera clock writes data into the FIFO memory 12 when the wr_req_sync control signal is a logic one.

Controller 22 generates the wr_req signal supplying the wr_req signal to the D input of Flip-Flop 30. The wr_req signal is asserted all of the time, except during the power up cycle for interface circuit 10.

The controller also generates a rd_req (read request) signal which is supplied to the rdreq (read request) input of FIFO memory 12. When there is requirement to transmit an additional byte of data, the read request signal is not asserted and logic zeros are transmitted from FIFO memory 12.

The inverted camera clock is also supplied to the clock input of a group of twenty D Flip-Flops 36. The camera clock then latches data bits 19 . . . 0 to the q[19 . . . 0] outputs of the D Flip-Flops 36. In addition, to the video data bits d[13 . . . 0] and control signals d[16] and d[17] provided by the video camera, the twenty bit words supplied to the data inputs of Flip-Flops 36 include a pair of zeros d[15 . . . 14] and a pair of RS-232 bits d[19 . . . 18]. Each twenty bit word fi[19 . . . 0] is sent to the data[19 . . . 0] inputs of FIFO memory 12 from D Flip-Flops 36 via a data bus 38.

Data is read from the q[19 . . . 00] output of FIFO memory 12 and sent to the cam_data input of controller 22 via a data bus 40. A six bit ru[5 . . . 0] signal line 42 indicates to controller 22, the memory space within FIFO memory 12 currently in use.

The signal rx_sig_det is an LED status signal. There is also a receive error signal supplied to the rx_err input of controller 22. This signal indicates that the fiber cable has an error. There are also a pair of test mode inputs test_cnt_en and test_cam_en within the controller 22 which are grounded.

The stable clock generator (TX_Clock) 18 generates the stable clock signal which has frequency of 64 MHz. This 64 MHz stable clock signal is supplied to the clk64 input of controller 22 and the rdclk input of FIFO memory 12. When the rdreq input of FIFO memory 12 is at the logic one state, the 64 MHz stable clock signal reads the data from FIFO memory 12.

The controller 22 generates two signals tx_en and tx_err used to convert the parallel digital data stream output to a serial stream for transmission over fiber by an external transmission component. The interface circuit 10 operates in the following manner. At power up the controller 22 waits until the FIFO memory 22 is half full of video data from the camera. When the FIFO memory 12 is half full, controller 14 begins transmitting video data stored in FIFO memory 12 from FIFO memory 12 using the 64 MHz stable clock generated by clock generator 18. Over time the stable clock and the camera clock drift apart and FIFO memory 12 becomes fuller or less empty. When the threshold is reached FIFO memory 12 will either add or delete an extra idel words from the transmitted data.

When FIFO memory 12 becomes less than one quarter full, controller 22 waits for an idle/sync word and then transmits the word twice. The controller 22 will continue this process until memory space within FIFO memory 12 is more than one quarter full. When FIFO memory 12 becomes greater than three quarters full, controller 22 waits for an idle/sync word. At this time controller 22 will read out two words in one cycle ignoring the idle/sync word. The controller 22 will continue this process until memory space within FIFO memory 12 is less than three quarters full. There is a requirement for sufficient idle/sync words in the video data stream to account for the drift between camera clock and the 64 MHz stable clock.

From the foregoing, it is readily apparent that the present invention comprises a new, unique and exceedingly useful apparatus and method for transmitting a high jitter clock signal in a serial data stream over a single fiber cable, which constitutes a considerable improvement over the known prior art. Obviously, many modifications and variations of the present invention are possible in light of the above teachings. It is therefore to be understood that within the scope of the appended claims that the invention may be practiced otherwise than as specifically described.

The listing for the computer software used in controller 22 is set forth as follows:

Program Listing for Controller 22

%

Transmit Data This is the merging of two designs. The transmit at the computer and the camera. Both design are present in all of their glory. This modifications includes both with little modifications. Basically, the output to the transmitter is just multiplexed, depending upon the input signal tx_mode_n.

In RX Mode: (AT Computer)

This routine takes the data on the RS-232 input ports and the external sync signals and spare[7-4]. These signals are sent to the TI transceiver at a 64 MHz rate. Every clock cycle. The upper bits of the transmit word are set to zero.

Word 1—Data
  Bit 0—RS232[0]
  Bit 1—RS232[1]
  Bit 2—Ext_Sync[0]
  Bit 3—Ext_Sync[1]
  Bits 4-7—Spare[7-4]

In TX Mode: (AT Camera)

This routine takes the data from the camera at 32 MHz and transmits it over the fiber at 2× the clock or 64 MHz. The data is sent as shown below. A fifo takes in the data at the 32 MHz. If the data is coming in quicker a clock is removed each line. If the data is coming in slower a clock is added each line. The amount of data in the fifo is monitored to determine when there is too little or much data. The added clock is done at the end of each line during horizontal blanking. This only done if VBLANK is not asserted.

Word 1—Camera intensity data
Word 2—Control bits
  Bits 15-4 Spare
  Bits 3-2 RS232

Bit 1 Vertical Sync
Bit 0 Horizontal Sync

Camera Timing, 768 clocks per line, 640 valid data points per line, 694 total lines, 512 valid data lines, 38 lines before vertical sync, 144 lines after vertical sync.

August 2006

Modified transmit resync state machine to restart if the fifo becomes empty. Also added time out if fifo data does not become available.

By Ron Prusia, May 2006

```
%
INCLUDE "lpm_counter.inc";
SUBDESIGN tx_data
(
    aclr              : INPUT;      %System clear%
    clk64             : INPUT;      %Input clock 64 MHz%
    rs232[1..0]       : INPUT;
    ext_sync[1..0]    : INPUT;
    spare[7..4]       : INPUT;
    rx_err            : INPUT;
    cam_data[19..0]   : INPUT;      %Camera data%
    fifo_used[5..0]   : INPUT;      %Used amount of fifo%
    test_cnt_en       : INPUT;      %Test enable inputs%
    test_cam_en       : INPUT;
    tx_mode_n         : INPUT;      %Board mode control%
%%
    tx_out[15..0]     : OUTPUT;
    tx_en             : OUTPUT;
    tx_err            : OUTPUT;
    rd_req            : OUTPUT;     %To fifo to read word%
    wr_req            : OUTPUT;
    resync            : OUTPUT;     %Status output, of added/removed clocks%
    fifo_reset        : OUTPUT;
    tx_ok             : OUTPUT;
)
VARIABLE
    dsync1[7..0]      : DFF;        %Used to sychronize input signals%
    dsync2[7..0]      : DFF;
    tx_end            : DFFE;       %Register control outputs%
    tx_errd           : DFFE;
    clk32_int         : DFF;        %Clock 32 Mhz%
    in_ff[19..0]      : DFFE;       %Sync inputs from fifo%
    in_ffc[3..0]      : DFFE;       %Extra delay to even up control signals%
    out_reg[17..0]    : DFF;        %Final output, with mux'd TX or RX inputs tx_en =
                                     bit 16 and tx_err = bit17%
    trans_delay       : lpm_counter WITH (LPM_WIDTH=8,LPM_SVALUE=240); %Delay 256 clocks%
    test_cnt_rx       : lpm_counter WITH (LPM_WIDTH=8);    %test counter%
    test_cnt_tx       : lpm_counter WITH (LPM_WIDTH=20);   %Test counter%
    hcnt              : lpm_counter WITH (LPM_WIDTH=10,LPM_MODULUS=768,LPM_SVALUE=1);
                                     %Horizontal pixel counter%
    vcnt              : lpm_counter WITH (LPM_WIDTH=10,LPM_MODULUS=694); %Line clock%
    fifo_time_out     : lpm_counter WITH (LPM_WIDTH=8);    %Timeout for fifo%
    sshor             : MACHINE WITH STATES (s1,s2);
    sstx              : MACHINE WITH STATES (txdelay,fifodelay,read,mon);
BEGIN
%
```

Multiplexer to select either the RX COMPUTER output or the TX CAMERA output. Also set the TX OK output.

```
%
    out_reg[ ].clk = clk64;
    out_reg[ ].clrn = !aclr;
    IF tx_mode_n THEN    %RX COMPUTER MODE%
        out_reg[15..8] = GND;
        out_reg[7..0] = dsync2[7..0].q;
        tx_ok = tx_err;
    ELSE                 %TX CAMERA MODE OUTPUTS%
        IF (fifo_used[ ] == 0) THEN tx_ok = VCC;
        ELSE tx_ok = GND;
        END IF;
```

-continued

```
        IF !clk32_int.q then    %Mutliplex outputs for 64 MHz%
            out_reg[15..0] = in_ff[15..0] .q;
        ELSE
            out_req[3..0] = in_ffc[3..0].q;
            out_reg[15..4] = GND;
        END IF;
    END IF;
```

-continued

```
%%
    tx_out[15..0] = out_reg[15..0].q;    %Transmit all 15-bits%
    tx_en = out_reg[16].q;
    tx_err = out_reg[17].q;
%
RX COMPUTER
```

This section performs the functions for reception at the computer. The test counters are different for each mode. However in RX the count is enable in either mode. The same transmission delay is used for both modes.

```
%
    dsync1[ ].clk = clk64;        %Double buffer input data with DFF%
    dsync1[ ].clrn = !aclr;
    dsync1[1..0].d = rs232[ ];
    dsync1[3..2].d = ext_sync[ ];
    dsync1[7..4].d = spare[ ];
%
```

Second level of latching, if test enable high then output counter to transmitter.

```
%
    test_cnt_rx.clock = clk64;
    test_cnt_rx.aclr = aclr;
    dsync2[ ].clk = clk64;
    dsync2[ ].clrn = !aclr;
    IF test_cnt_en OR test_cam_en then dsync2[ ].d =
    test_ant_rx.q[ ];
    ELSE dsync2[ ].d = dsync1[ ].q;
    END IF;
%
```

Transmit enable delay at power up, 256 clocks. Disable counter at carry out. If transmit error, reset count to 240.

```
%
    trans_delay.clock = clk64;
    trans_delay.aclr = aclr;
    trans_delay.sset = tx_errd.q;
    IF !trans_delay.cout AND !clk32_int.q THEN
    trans_delay.cnt_en = VCC;
    END IF;
    tx_end.clk = clk64;           %Register output%
    tx_end.clrn = !aclr;
    tx_end.d = trans_delay.cout;
    tx_end.ena = !clk32_int.q;
    out_reg[16].d = tx_end.q;
    tx_errd.clk = clk64;          %Register outputs%
    tx_errd.clrn = !aclr;
    tx_errd.d = rx_err AND trans_delay.cout;
    tx_errd.ena = !clk32_int.q;
    out_reg[17].d = tx_errd.q;
%
TX CAMERA
```

This section performs the functions for the transmit of the camera data.

```
%
    clk32_int.clk = clk64;
    clk32_int.clrn = !aclr;
    clk32_int.d = !clk32_int.q;
%
```

If test_enable high, output counter for all of the inputs.

```
%
    test_cnt_tx.clock = clk64;
    test_cnt_tx.aclr = aclr;
    test_cnt_tx.cnt_en = !clk32_int.q;
    vcnt.clock = clk64;
    vcnt.aclr = aclr;
    vcnt.cnt_en = hcnt.q[ ] == 767 AND !clk32_int.q;
```

-continued

```
%%
    in_ff[ ].clk = clk64;         %Register input data%
    in_ff[ ].clrn = !aclr;
    in_ff[ ].ena = !clk32_int;
%
```

Generate test outputs if desired.

```
%
    IF !test_cnt_en & !test_cam_en THEN
        in_ff[ ].d = cam_data[ ];
    ELSIF test_cnt_en THEN
        in_ff[ ].d = test_cnt_tx.q[ ];
    ELSIF test_cam_en AND vcnt.q[ ] < 512 AND hcnt.q[ ] ==
    128 THEN
        in_ff[9..0].d = vcnt.q[ ];
        in_ff[15..10].d = GND;
        in_ff[17..16].d = VCC;
        in_ff[19..18].d = GND;
    ELSIF test_cam_en AND vcnt.q[ ] < 512 AND hcnt.q[ ] >
    128 THEN
        in_ff[9..0].d = hcnt.q[ ];
        in_ff[15..10].d = GND;
        in_ff[17..16].d = VCC;
        in_ff[19..18].d = GND;
    ELSIF test_cam_en AND vcnt.q[ ] == 549 and hcnt.q[ ] > 759
    THEN %Ver Sync%
        in_ff[19..0].d = GND;
    ELSE
        in_ff[16..0].d = GND;
        in_ff[17].d = VCC;
        in_ff[19..18].d = GND;
    END IF;
%%
    in_ffc[ ].clk = clk64;        %Extra register to sync control data%
    in_ffc[ ].clrn = !aclr;
    in_ffc[ ].ena = !clk32_int;
    in_ffc[3..0].d = in_ff[19..16].q;
%
```

Monitor horizontal sync and reset counter on falling edge of horizontal sync to "1". Otherwise the counter naturally rolls over at the modulus of 768.

```
%
    hcnt.clock = clk64;
    hcnt.cnt_en = !clk32_int;
    hcnt.aclr = aclr;
    sshor.clk = clk64;
    sshor.reset = aclr;
    CASE sshor IS
        WHEN s1 =>        %Reset%
            IF !in_ffc[0].q THEN
                sshor = s2;
                IF (!test_cnt_en) AND (!test_cam_en) THEN hcnt.sset =
                VCC;
                END IF;
            ELSE
                sshor = s1;
            END IF;
        WHEN s2 => %Wait for low to go away.%
            IF !in_ffc[0].q THEN
                sshor = s2;
            ELSE
                sshor = s1;
            END IF;
        WHEN OTHERS =>
            sshor = s1;
    END CASE;
%
```

Wait for power up delay, and then enable fifo. Wait for fifo to become half full. Monitor horizontal sync. It is low 4 uS and the total cycle time is 24 uS. The extra clock is added/removed after the high to low transition on pixel count 4. The vertical clock in_ffc[1] must be high. The fifo must have more than eight extra or eight less for deletion of addition of a clock. Added the function to time out if the fifo does not become ready. If there is a time out, the state machine will go back to txdelay state and reset the fifo.

```
%
    fifo_time_out.clock = clk64;
    fifo_time_out.aclr = aclr;
    IF !fifo_time_out.cout THEN fifo_time_out.cnt_en = VCC;
    END IF;
%%
    sstx.clk = clk64;
    sstx.reset = aclr;
    CASE sstx IS
        WHEN txdelay =>        %Reset%
            fifo_reset = VCC;
            IF trans_delay.cout THEN
                sstx = fifodelay;
                fifo_time_out.sclr = VCC;
            ELSE sstx = txdelay;
            END IF;
        WHEN fifodelay =>       %Wait for fifo half full%
            wr_req = VCC;       %Assert fifo write continously%
            IF !fifo_used[5] AND !fifo_time_out.cout THEN
                sstx = fifodelay;
            ELSIF !fifo_used[5] AND fifo_time_out.cout THEN
                sstx = txdelay;
            ELSE
                sstx = read;
                rd_req = VCC;   %Two clock fifo read delay for data%
            END IF;
        WHEN read =>       %Two clock fifo read delay for data%
            wr_req = VCC;  %Assert fifo write continously%
            rd_req = VCC;
            sstx = mon;
        WHEN mon =>        %Wait for horizontal blanking%
            wr_req = VCC;  %Assert fifo write continously%
            IF !clk32_int.q and hcnt.q[ ] != 4 THEN rd_req = VCC;
                ELSIF !clk32_int.q and hcnt.q[ ] == 4 and in_ffc[1].q and fifo_used[ ]
> 24 THEN rd_req = VCC;
            ELSIF !clk32_int.q and hcnt.q[ ] == 4 and !in_ffc[1].q THEN rd_req = VCC;
            ELSIF clk32_int.q and hcnt.q[ ] == 4 and in_ffc[1].q and fifo_used[ ] >
40 THEN
                rd_req = VCC;
                resync = VCC;
            END IF;
            IF !clk32_int.q and hcnt.q[ ] == 4 and in_ffc[1].q and fifo_used[ ] < 25
THEN
                resync = VCC;
            END IF;
            IF trans_delay.cout AND (fifo_used[ ] != 0) THEN sstx = mon;
            ELSE sstx = txdelay;
            END IF;
        END CASE;
END;
```

What is claimed is:

1. A method for transmitting video data from a video camera on a data transmission line comprising the steps of:

a. receiving said video data from said video camera at a first frequency;

b. storing said video data in memory space within a first-in first-out memory until one-half of said memory space has video data from said video camera stored therein;

c. transmitting said video data from said memory over said data transmission line as a serial data stream when one half of said memory space has video data stored therein, wherein said video data is transmitted from said first-in first-out memory over said transmission line at a second frequency;

d. monitoring memory usage of said memory space within said first-in, first-out memory wherein a controller monitors said memory space within said first-in first-out memory;

e. adding unused data words to said serial data stream wherein said controller determines when to add said unused data words to said serial data stream by monitoring the memory usage of said memory space within said first-in, first-out memory and then adds said unused data words to said serial data stream; and f. deleting unused data words from said serial data stream wherein said controller determines when to add said unused data words to said serial data stream by monitoring the memory usage of said memory space within said first-in, first-out memory and then deletes said unused data words from said memory stream.

2. The method of claim 1 wherein said first frequency for receiving said video data is approximately thirty two megahertz.

3. The method of claim 2 wherein said second frequency for transmitting said video data from said first-in first-out memory is approximately sixty four megahertz.

4. The method of claim 3 further comprising the step of providing a camera generated input clock at said first frequency to store said video data in said first-in first-out memory and a stable clock at said second frequency to read said data from said first-in first-out memory.

5. The method of claim 4 wherein the memory usage within said first-in first-out memory indicates a drift between said camera generated input clock and said stable clock, wherein said controller compensates for said drift by adding said unused data words to said serial data stream or deleting said unused data words from said serial data stream.

6. The method of claim 1 wherein said data transmission line comprises a fiber cable.

7. A method for transmitting video data from a video camera on a data transmission line comprising the steps of:
 a. receiving said video data from said video camera at a first frequency;
 b. storing said video data in memory space within a first-in first-out memory until one-half of said memory space has video data from said video camera stored therein;
 c. transmitting said video data from said memory over said data transmission line as a serial data stream when one half of said memory space has video data stored therein, wherein said video data is transmitted from said first-in first-out memory over said data transmission line at a second frequency;
 d. monitoring memory usage of said memory space within said first-in, first-out memory wherein a controller monitors said memory space within said first-in first-out memory;
 e. adding unused data words to said serial data stream wherein said controller determines when to add said unused data words to said serial data stream by monitoring the memory usage of said memory space within said first-in, first-out memory and then adds said unused data words to said serial data stream; and
 f. deleting said unused data words from said serial data stream wherein said controller determines when to add said unused data words to said serial data stream by monitoring the memory usage of said memory space within said first-in, first-out memory and then deletes said unused data words from said memory stream;
 g. waiting for at least one unused data word or a sync word when the memory space within said first-in first-out memory is less than one quarter full or more than three quarters full with said video data, wherein said controller continuously monitors said memory space to determine when said first-in first-out memory is less than one quarter full or more than three quarters full with said video data;
 h. controlling a transmission of said unused data word or said sync word until the memory space within said first-in first-out memory is more than one quarter full and
 i. controlling a read out of said unused data word or said sync word from said first-in, first-out memory until the memory space within said first-in first-out memory is less than three quarters full with said video data.

8. The method of claim 7 wherein said first frequency for receiving said video data is approximately thirty two megahertz.

9. The method of claim 8 wherein said second frequency for transmitting said video data from said first-in first-out memory is approximately sixty four megahertz.

10. The method of claim 9 wherein the memory usage within said first-in first-out memory indicates a drift between said camera generated input clock and said stable clock, wherein said controller compensates for said drift by adding said unused data words to serial data stream or deleting said unused data words from said serial data stream.

11. The method of claim 7 wherein said data transmission line comprises a fiber cable.

12. The method of claim 7 further comprising the step of providing a group of twenty D Flip-Flops to receive said video data at said first frequency and a pair of control bits from said video camera, and latch said video data and said pair of control bits therein, and then transfer said video data and said pair of control bits to said first-in first-out memory for storage in said first-in first memory.

13. The method of claim 7 wherein said pair of control signals which comprise a vertical sync control signal and a horizontal sync control signal indicate a validity for said video data being stored in said first-in, first-out memory.

14. A method for transmitting video data from a video camera on a data transmission line comprising the steps of:
 a. receiving said video data from said video camera at a first frequency;
 b. storing said video data in memory space within a first-in first-out memory until one-half of said memory space has video data from said video camera stored therein;
 c. transmitting said video data from said memory over said data transmission line as a serial data stream when one half of said memory space has video data stored therein, wherein said video data is transmitted from said first-in first-out memory over said data transmission line at a second frequency;
 d. monitoring memory usage of said memory space within said first-in, first-out memory wherein a controller monitors said memory space within said first-in first-out memory;
 e. adding unused data words to said serial data stream wherein said controller determines when to add said unused data words to said serial data stream by monitoring the memory usage of said memory space within said first-in, first-out memory and then adds said unused data words to said serial data stream; and
 f. deleting said unused data words from said serial data stream wherein said controller determines when to add said unused data words to said serial data stream by monitoring the memory usage of said memory space within said first-in, first-out memory and then deletes said unused data words from said memory stream;
 g. waiting for at least one unused data word or a sync word when the memory space within said first-in first-out memory is less than one quarter full or more than three quarters full with said video data, wherein said controller continuously monitors said memory space to determine when said first-in first-out memory is less than one quarter full or more than three quarters full with said video data;
 h. transmitting said unused data word or said sync word twice until the memory space within said first-in first-out memory is more than one quarter full with said video data; and i. reading out two words in a cycle from said first-in, first-out memory ignoring said unused data word or said sync word until said memory space within said first-in first-out memory is less than three quarters full with said video data.

15. The method of claim 14 wherein said first frequency for receiving said video data is approximately thirty two megahertz.

16. The method of claim 15 wherein said second frequency for transmitting said video data from said first-in first-out memory is approximately sixty four megahertz.

17. The method of claim 16 wherein the memory usage within said first-in first-out memory indicates a drift between said camera generated input clock and said stable clock, wherein said controller compensates for said drift by adding said unused data words to serial data stream or deleting said unused data words from said serial data stream.

18. The method of claim 17 wherein said data transmission line comprises a fiber cable.

19. The method of claim 14 further comprising the step of providing a group of twenty D Flip-Flops to receive said video data at said first frequency and a pair of control bits from said video camera, and latch said video data and said pair of control bits therein, and then transfer said video data and said pair of control bits to said first-in first-out memory for storage in said first-in first memory.

20. The method of claim 19 wherein said pair of control signals which comprise a vertical sync control signal and a horizontal sync control signal indicate a validity for said video data being stored in said first-in, first-out memory.

* * * * *